(12) United States Patent
Choi et al.

(10) Patent No.: US 8,132,305 B2
(45) Date of Patent: Mar. 13, 2012

(54) EQUIPMENT AND METHOD FOR CUTTING PACKAGE

(75) Inventors: Tai-Kew Choi, Chungcheongnam-do (KR); Yong-Kyun Sun, Chungcheongnam-do (KR); Hee-Sang Yang, Chungcheongnam-do (KR); Yo-Se Eum, Chungcheongnam-do (KR); Ho-Soo Jang, Busan (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 1180 days.

(21) Appl. No.: 11/848,152

(22) Filed: Aug. 30, 2007

(65) Prior Publication Data

US 2008/0056832 A1    Mar. 6, 2008

(30) Foreign Application Priority Data

Aug. 30, 2006 (KR) .................. 10-2006-0082942

(51) Int. Cl.
*B23P 23/00* (2006.01)
*B23C 1/08* (2006.01)
*B23C 5/10* (2006.01)
*B23C 5/12* (2006.01)

(52) U.S. Cl. ......... 29/33 P; 409/212; 409/192; 409/138; 409/208; 409/219; 409/158; 409/159; 269/21; 407/54; 407/60

(58) Field of Classification Search .............. 29/563, 29/33 P, 33 M; 198/345.3, 346.1; 409/192, 409/203, 213, 217, 202, 212, 159, 158, 163, 409/172, 186–187, 207–208, 193–194, 219, 409/225, 79–80, 138; 407/53–54, 60; 269/21; 408/42–44, 31, 53, 16
See application file for complete search history.

(56) References Cited

U.S. PATENT DOCUMENTS

| | | | | | |
|---|---|---|---|---|---|
| 3,413,893 | A | * | 12/1968 | Wilson | 409/217 |
| 3,460,012 | A | * | 8/1969 | Nelson et al. | 318/603 |
| 4,326,824 | A | * | 4/1982 | Lasermann et al. | 409/132 |
| 5,407,415 | A | * | 4/1995 | Spishak | 483/4 |
| 5,743,685 | A | * | 4/1998 | Piggott | 409/131 |
| 7,131,800 | B2 | * | 11/2006 | Anderson et al. | 409/132 |
| 7,204,663 | B2 | * | 4/2007 | Dov et al. | 407/53 |
| 7,600,953 | B2 | * | 10/2009 | Dessoly | 409/132 |

(Continued)

FOREIGN PATENT DOCUMENTS

JP    2004-202591    7/2004

(Continued)

OTHER PUBLICATIONS

Machine Translation of KR 20010106152, which KR '152 was published Nov. 2001.*

(Continued)

*Primary Examiner* — Erica E Cadugan
(74) *Attorney, Agent, or Firm* — Muir Patent Consulting, PLLC

(57) ABSTRACT

A package cutting apparatus includes at least two spindles installed at a sawing robot and cutting a frame including a plurality of packages into packages using cutting bits; a frame loading jig loading the frame so that the frame is cut; and a frame-and-unit picker installed at an orthogonal robot to load and unload the frame on and from the frame loading jig, wherein a state of the cutting bit installed at the spindle is checked.

28 Claims, 12 Drawing Sheets

U.S. PATENT DOCUMENTS

2006/0056955 A1 * 3/2006 Kim et al. .................. 414/806

FOREIGN PATENT DOCUMENTS

| KR | 2001-0106152 | 11/2001 |
| KR | 10-2005-0043791 | 5/2005 |
| WO | WO-02/070181 A2 * | 9/2002 |

OTHER PUBLICATIONS

English language abstract of Korean Publication No. 2001-0106152.
English language abstract of Japanese Publication No. 2004-202591.
English language abstract of Korean Publication No. 10-2005-0043791.

* cited by examiner

FIG. 12

ARRANGEMENT WHEREIN EACH OF THE VACUUM TUBES OF FIGURE 8 INCLUDES A PRESSURE SENSOR FOR MEASURING A VACUUM PRESSURE

FIG. 13

HIGH QUALITY SORTING BOX FOR STORING CUT PACKAGES HAVING A CHARACTERISTIC THAT MEETS A THRESHOLD QUALITY

SORTING CIRCUITRY FOR SORTING THE PACKAGES INTO THE PLURALITY OF SORTING BOXES

POOR QUALITY SORTING BOX FOR STORING CUT PACKAGES HAVING A CHARACTERISTIC THAT DOES NOT MEET THE THRESHOLD QUALITY, DIVIDED INTO 'N' PARTS FOR STORING PACKAGES THAT ARE TO BE SCRAPPED AND PACKAGES THAT ARE TO BE RE-USED

EMPTY SORTING BOX

EQUIPMENT AND METHOD FOR CUTTING PACKAGE

CROSS-REFERENCE TO RELATED PATENT APPLICATION

This application claims the benefit of foreign priority to Korean Patent Application No. 10-2006-0082942, filed on Aug. 30, 2006, the disclosure of which is incorporated herein in its entirety by reference.

BACKGROUND

1. Field of Invention

Embodiments of the present invention generally relate to an apparatus and a method for manufacturing a semiconductor. More particularly, embodiments of the present invention relate to an apparatus and a method for cutting a package from a frame.

2. Description of the Related Art

If chip scale packages are produced in the semiconductor field, a molding process can be performed with respect to a frame including a plurality of packages. The molded frame is then cut into packages. Cutting equipment (e.g., sawing equipment) can be used for cutting a frame into a plurality of packages.

Conventional cutting equipment cuts packages from frames along straight lines only. Nevertheless, packages with diverse shapes can be cut along curved lines using a new package cutting equipment called a router. Routers generally cut packages slowly. Also, routers cannot perform cutting at a time using the same blade or a cutting bit as existing sawing equipment. In addition, one or more types of cutting bits must be replaced to cut along a straight-line to cut along a curved-line. Thus, productivity can be low when cutting packages from a frame using a conventional router.

FIG. 1 is a schematic perspective view of a conventional router.

Referring to FIG. 1, a conventional router includes a spindle 30, a cutting bit 40, a bit loading jig 50, a frame loading jig 70, and a frame-and-unit picker 80. The spindle 30 is connected to a sawing robot 10 to perform a cutting process. The cutting bits 40 are installed at the spindle 30. The cutting bits 40 are loaded on the bit loading jig 50 to be subsequently coupled to the spindle 30. A frame 60 to be subjected to a cutting process is loaded on the frame loading jig 70. The frame-and-unit picker 80 is connected to an orthogonal robot 20 to load the frame 60 onto the frame loading jig 70 and unload packages that have been cut completely from the frame 60 (i.e., "completely cut" packages) from the frame loading jig 70.

The spindle 30 is connected to the sawing robot 10 through a connection part (not shown). The spindle moves up and down and rotates to the left and right to cut packages from the frame 60 on the frame loading jig 70.

The cutting bits 40 loaded on the bit loading jig 50 include chamfer bits 42 and router bits 44. The chamfer bits 42 are used to cut (hereinafter referred to as "chamfer-cut") packages within the frame 60 along a straight line so that a section of the package is chamfered. The router bits 44 are used to cut (hereinafter referred to as "router-cut") packages within the frame 60 along a curved line so that a router-cutting section of the package outside the chamfer-cutting section is cut. When the cutting bits 40 are installed at the spindle 30, sensors 90, i.e., bit check sensors 92 and bit height check sensors 94, are used to check whether the cutting bits 40 have been installed properly.

The frame-and-unit picker 80 unloads completely cut packages from the frame loading jig 70 and moves the completely cut packages to a package cleaner 95. Also, the frame-and-unit picker 80 moves remaining pieces of the frame other than the completely cut packages to a scrap box 98.

Constructed as described above, the router has a very slow cutting speed. Also, the chamfer bits 42 and router bits 44 must be switched into and out of the spindle 30 to perform the chamfer-cutting and router-cutting processes. Such alternate replacement of cutting bits can further lower productivity. In addition, a lifespan of the cutting bits, i.e., a time required for wearing down and replacing the cutting bits, is relatively short. Thus, productivity is further lowered due to the need to replace worn cutting bits.

FIG. 2 is a plan view illustrating a cutting line of a package.

Referring to FIG. 2, chamfer bits perform a chamfer-cut on a chamfer-cutting line A1 and router bits perform a router-cut on a router-cutting line A2. Thus, if a package 60-1 is cut using the conventional router described above, the chamfer-cutting line A1 is chamfer-cut using a chamfer bit, the chamfer bit is replaced with a router bit, and the chamfer-cut package is then router-cut along the router-cutting line A2 using the router-bit.

When portion A3 of the router-cutting line A2 is router-cut using a router bit, then the portion A3 is router-cut to have a predetermined curvature according to a diameter of the router bit. As the diameter of the router bit decreases, the curvature of portion A3 is desirably reduced. However, as the diameter of the router bit decreases, the overall speed with which the package 60-1 is router-cut undesirably decreases. As a result, router bits of varying sizes are generally replaced with one another during cutting along the router-cutting line A2. Thus, productivity of a cutting process using the conventional router can be lowered even further.

FIG. 3A is a view illustrating checking of a height of a conventional cutting bit using a sensor.

Referring to FIG. 3A, a conventional router checks a state of a cutting bit 40 installed at a spindle 30 using a sensor 90. In particular, the sensor 90 is provided as a bit height check sensor 90 to check a height of the cutting bit 40. However, when the spindle 30 rotates at a high speed, a part of the spindle 30 in which the cutting bit 40 is installed is often sensed instead. Moreover, the rotating spindle 30 acts to diffuse the reflected light back to the sensor 90. Thus, it can be difficult to measure an exact height of the cutting bit 40 due to the diffused reflection of light.

Checking the height of a cutting bit can be particularly important when a chamfer bit is performing a chamfer-cutting operation. The conventional router uses the sensor and thus is difficult to measure an exact height. Thus, an error frequently occurs in a cutting process.

FIG. 3B is a view illustrating a shape of a combined part of a cutting bit sensed by the sensor illustrated in FIG. 3A. Referring to FIG. 3B, it is difficult to exactly sense a part of a spindle in which the cutting bit is installed due to a diffused reflection of light, etc.

As described above, a conventional router has a slow cutting speed. Also, cutting bits must be frequently replaced. As a result, productivity can be low. In addition, sensors are typically used to check heights of the cutting bits. Thus, it is difficult to exact heights of chamfer bits. As a result, errors occur in a chamfer-cutting process. Moreover, conventional routers often fix a frame through a vacuum adsorption to perform a cutting process. Errors usually occur in the cutting process due to a poor vacuum adsorption.

SUMMARY

Embodiments of the present invention can be adapted to provide an apparatus and a method for cutting a package by which a number of times cutting bits are replaced can be reduced to improve productivity in a package cutting process, and heights of the cutting bits can be exactly checked to prevent poor cutting.

Embodiments of the present invention can be adapted to provide an apparatus and a method for cutting a package by which a frame can be further stably fixed during a cutting process, and packages can be separately fixed to minimize poorness of the packages caused by cutting.

One embodiment exemplarily described herein can be generally characterized as a package cutting apparatus that includes a sawing robot; a plurality of spindles coupled to the sawing robot; a plurality of cutting bits coupled to the plurality of spindles for cutting a package from a frame during a cutting process; a frame loading jig for supporting the frame during the cutting process; an orthogonal robot; a frame-and-unit picker coupled to the orthogonal robot for loading and unloading a frame onto and off from the frame loading jig; and a first sensor for checking a state of one of the plurality of cutting bits coupled to a corresponding one of the plurality of spindles.

Another embodiment exemplarily described herein can be generally characterized as a method of cutting a package using a package cutting apparatus. The method may, for example, include coupling a plurality of cutting bits to a plurality of spindles; loading at least one frame onto a frame loading jig; cutting a package from the at least one frame using the plurality of spindles; unloading the cut package from the frame loading jig; and checking a state of at least one of the plurality of cutting bits coupled to a corresponding one of the plurality of spindles.

BRIEF DESCRIPTION OF THE DRAWINGS

The above and other features of the embodiments of the present invention will become more apparent by describing in detail exemplary embodiments thereof with reference to the attached drawings in which:

FIG. 12 schematically shows an arrangement wherein each of the vacuum tubes of FIG. 8 includes a pressure sensor for measuring a vacuum pressure.

FIG. 13 schematically shows a sorting arrangement.

DETAILED DESCRIPTION

Figure 1:
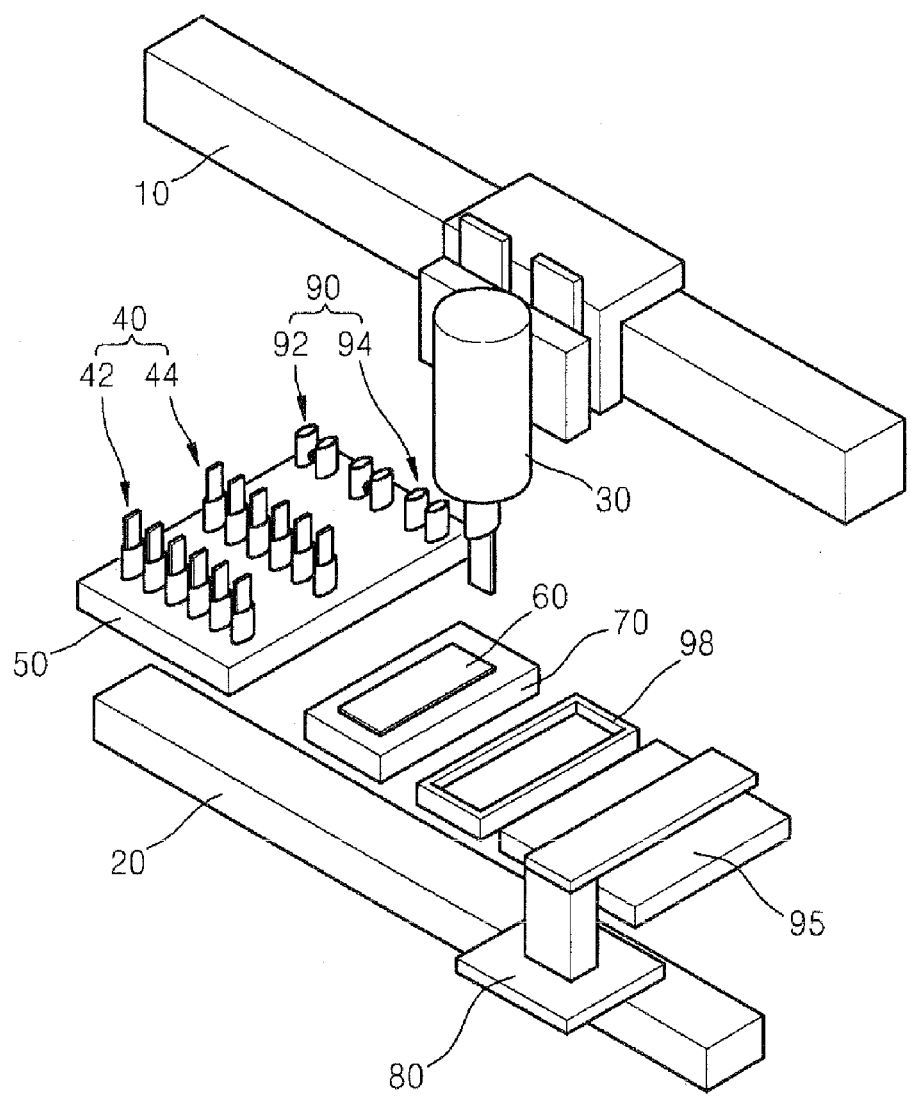
FIG. 1 is a schematic perspective view of conventional equipment for cutting a package.
Figure 2:
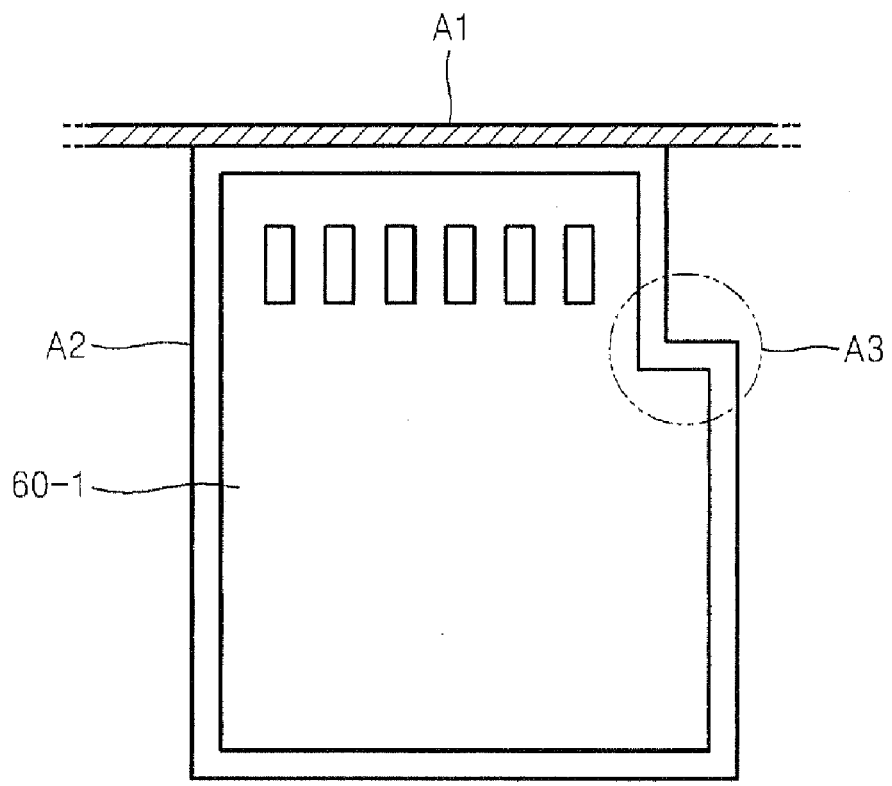
FIG. 2 is a plan view illustrating cutting lines of conventional packages.

Exemplary embodiments of the present invention will now be described with reference to the accompanying drawings. These embodiments may, however, be realized in many different forms and should not be construed as being limited to the embodiments set forth herein. Rather, these embodiments are provided so that this disclosure will be thorough and complete, and will fully convey the concept of the invention to those skilled in the art. In the drawings, the thicknesses of layers and regions are exaggerated for clarity. It will also be understood that when a layer is referred to as being "on" another layer or substrate, it can be directly on the other layer or substrate, or intervening layers may also be present. Like reference numerals in the drawings denote like elements, and thus their description will be omitted.

Figure 4:
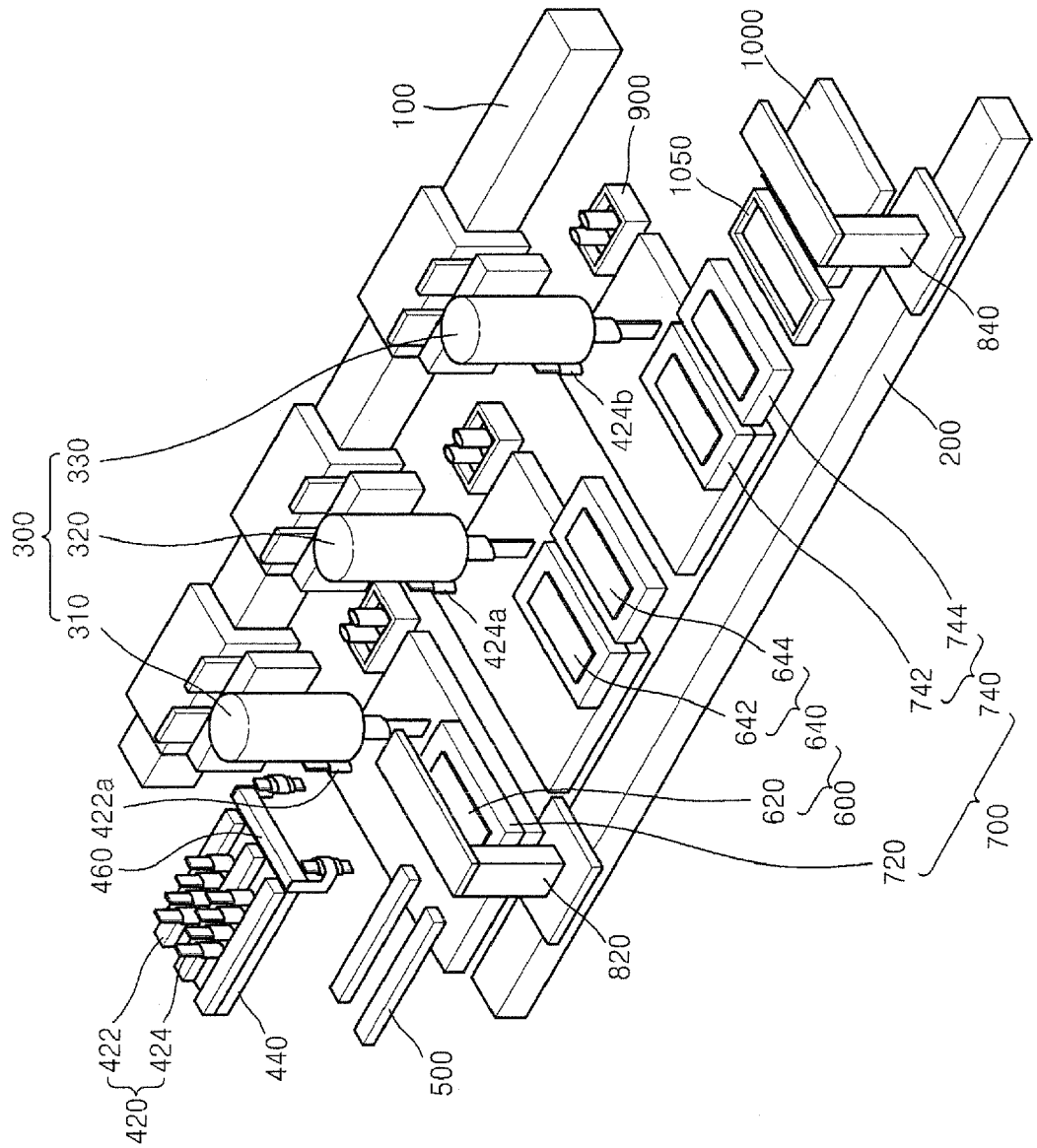
FIG. 4 is a schematic perspective view of one embodiment of an apparatus for cutting a package.

FIG. 4 is a schematic perspective view of one embodiment of an apparatus for cutting a package.

Referring to FIG. 4, a package cutting apparatus may, for example, include a plurality of spindles 300, a plurality of cutting bits 420, a bit loading jig 440, a frame loading jig 700, a frame picker 820, and a unit picker 840. Each spindle 300 is connected to a sawing robot 100 to perform cutting. Some of the plurality of cutting bits 420 are installed at the spindles 300. Others of the plurality of cutting bits 420 are loaded on the bit loading jig 440 where they wait to be installed at the spindles 300. A frame 600 can be loaded onto the frame loading jig 700 to perform a cutting process thereon. In one embodiment, alignment of the frame 600 with respect to the frame loading jig 700 may be performed using, for example, an alignment mark formed on the frame 600. The frame picker 820 is connected to an orthogonal robot 200 to load the frame 600 onto the frame loading jig 700. The unit picker 840 unloads packages which have been completely cut (i.e., "completely cut packages") from the frame loading jig 700.

In one embodiment, the package cutting apparatus includes at least two spindles 300. In another embodiment, the package cutting apparatus may include three spindles 300 (i.e., a first spindle 310, a second spindle 320, and a third spindle 330). The first spindle 310 is a chamfer-cutting spindle capable of chamfer-cutting a portion of the package, thereby creating a portion of the package to have a chamfered edge. The second and third spindles 320 and 330 are router-cutting spindles capable of router-cutting a portion of the package outside the chamfer-cut portion. Thus, chamfer bits 422 are installed at the first spindle 310 and router bits 424 are installed at the second and third spindles 320 and 330. Accordingly, the package cutting apparatus may include three spindles, wherein the first spindle 310 performs only chamfer-cutting and the second and third spindles 320 and 330 perform only router-cutting. Thus, a time required for replacing the chamfer bits 422 with the router bits 424 can be reduced.

An exemplary process with which to use the three spindles is described as follows. Chamfer-cutting is generally performed along a straight line and produces a chamfered edge. Accordingly, chamfer-cutting can be performed faster than router-cutting, which is generally performed along straight lines and curved lines. Thus, two frames can be chamfer-cut in about the time it takes to router-cut one frame. As a result, two router-cutting spindles (e.g., 320 and 330) may be included per every one chamfer-cutting spindle (e.g., 310) to smoothly perform a cutting process. In one embodiment, the spindles 310, 320 and 330 may be used without replacing the chamfer bits 422 and the router bits 424 at each spindle. In another embodiment, however, chamfer bits 422 and the router bits 424 may be replaced at one or more spindles.

In one embodiment, a router-cutting spindle may perform router-cutting by replacing a straight-line router bit, which is capable of cutting along substantially straight line, and a curved-line router bit, which is capable of cutting a curved line. In another embodiment, a router-cutting spindle may perform router-cutting using a two-step router bit capable of router-cutting along substantially straight line and along a curved line. An exemplary two-step router bit will be described in more detail with reference to FIGS. 5 and 6.

The cutting bits 420 include the chamfer bits 422 capable of chamfer-cutting a package and router bits 424 capable of router-cutting a package. The cutting bits 420 are loaded on the bit loading jig 440 to be supplied into the package cutting apparatus. The bit loading jig 440 may be attached to and/or detached from the package cutting apparatus. Thus, the cutting bits 420 may be supplied into the package cutting apparatus during the cutting process via the bit loading jig 440. Loaded on the bit loading jig 440, the cutting bits 420 may be automatically supplied onto a work-table on which the frame load jig 700 is placed and fixed. In one embodiment, the cutting bits 420 may be automatically supplied onto the work-table by an auto bit loader 460. As shown in FIG. 4, a chamfer bit 422a and router bits 424a and 424b wait on the work-table to be replaced. Also, cutting bits 420 whose lifespan has been exhausted may be dumped into reject bit boxes 900. The router bits 424 may include straight-line router bits capable of cutting along a substantially straight line, curved-line router bits capable of cutting along a curved line, and two-step router bits capable of cutting along substantially straight lines and along curved lines.

In one embodiment, the frame 600 is loaded onto the frame loading jig 700 by the frame picker 820. In one embodiment, the only function of the frame picker 820 is to load frames 600 onto the frame loading jig 700. A process of loading the frame 600 will now be briefly described. A frame 600, which has been subject to a molding process, is loaded into a magazine (not shown). The magazine is then loaded into an apparatus loader (not shown). Next, when the magazine advances to load a particular frame 600 in an elevator, the elevator moves an incremental amount to convey the particular frame 600 to a frame feed rail 500. Once conveyed to the frame feed rail 500, the frame 600 is loaded onto the frame loading jig 700 by the frame picker 820 where the frame 600 will be subjected to cutting processes.

In one embodiment, the frame loading jig 700 may be divided into a chamfer-cutting frame loading jig 720 and a router-cutting frame loading jig 740. The chamfer-cutting frame loading jig 720. A frame 600 loaded onto the chamfer-cutting frame loading jig 720 is identified at 620. In one embodiment, the router-cutting frame loading jig 740 includes a first router-cutting frame loading jig 742 and a second router-cutting frame loading jig 744. A frame 600 loaded onto the first router-cutting frame loading jig 742 is identified at 642. A frame 600 loaded onto the second router-cutting frame loading jig 744 is identified at 644. In one embodiment, frames loaded onto the first and second router-cutting frame loading jigs 742 and 744 have already been chamfer-cut.

The router-cutting frame loading jig 740 is introduced to rapidly and smoothly perform router-cutting. An exemplary process of router-cutting using the router-cutting frame loading jig 740 will now be described. If the first router-cutting frame loading jig 742 is cast onto a work table to router-cut a first frame that has already been chamfer-cut by the first spindle 310, a second frame that has already been chamfer-cut by the first spindle 310 may be loaded onto the second router-cutting frame loading jig 744. After the first frame loaded onto the first router-cutting frame loading jig 742 has been router-cut (e.g., by the second spindle 320), the first router-cutting frame loading jig 742 may be discharged from the work table and the second router-cutting frame loading jig 744 having the second frame loaded thereon may be cast onto the work table to perform router-cutting. Packages that have been chamfer-cut and router-cut (i.e., "completely cut packages") from the first frame may then be unloaded from the first router-cutting frame loading jig 742 by the unit picker 840. Subsequently, a third frame which has been chamfer-cut by the first spindle 310 may be loaded onto the first router-cutting frame loading jig 742 by the frame picker 820 while the second frame is router-cut and the aforementioned process may be repeated. As described above, a dual frame loading jig can be used to rapidly perform a router-cutting process.

In one embodiment, the unit picker 840 unloads the frames, which have been completely router-cut (i.e., "completely router-cut packages"), from the router-cutting frame loading jig 740. In one embodiment, the unit picker 840 disposes completely router-cut packages within a package cleaning zone or onto a package cleaner 1000. Top sides of the packages disposed in the package cleaning zone or onto the package cleaner 1000 may be cleaned (e.g., with a brush). If the top sides of the packages are cleaned, bottom sides of the packages may be cleaned when the unit picker 840 picks the packages up to complete a cleaning process. Remaining frame pieces other than packages are moved and dumped into a scrap box 1050.

After performing the cleaning process, the unit picker 840 disposes the cleaned packages into a junction pocket to check whether the packages meet a certain threshold quality. The junction pocket advances to inspect external surfaces of top sides of the packages using a sensor (e.g., an optical sensor). After the external surface of the top side of a package has been completely inspected, the external surface of the bottom side of the package may be inspected when the unit picker 840 picks up the packages. When external surfaces of a package are completely inspected, high quality packages are sorted and disposed in a high quality sorting box and poor quality packages are sorted and disposed in a poor quality sorting box. Sorting boxes may be classified into three boxes, i.e., the aforementioned high quality sorting box, the aforementioned poor quality sorting box, and an empty sorting box. The poor quality sorting box may be divided into N parts into which a user can selectively scrap or re-use packages. The sorting of packages can be automatically performed using sorting circuitry (not shown) coupled to the apparatus so as to perform a rapid, exact sorting process. As used herein, the term "circuitry" refers to any type of executable instructions that can be implemented, for example, as computer hardware, firmware, and/or software, which are all within the scope of the various teachings described.

As exemplarily described above, a package cutting apparatus can include three spindles and separately perform chamfer-cutting and router-cutting. Accordingly, the amount of time required to completely cut a package from a frame can be reduced because the need to replace chamfer bits with router bits (and vice versa) is eliminated. In addition, the chamfer-cutting and router-cutting can be performed in parallel to reduce a cutting process time and considerably increase productivity.

Figure 5A:
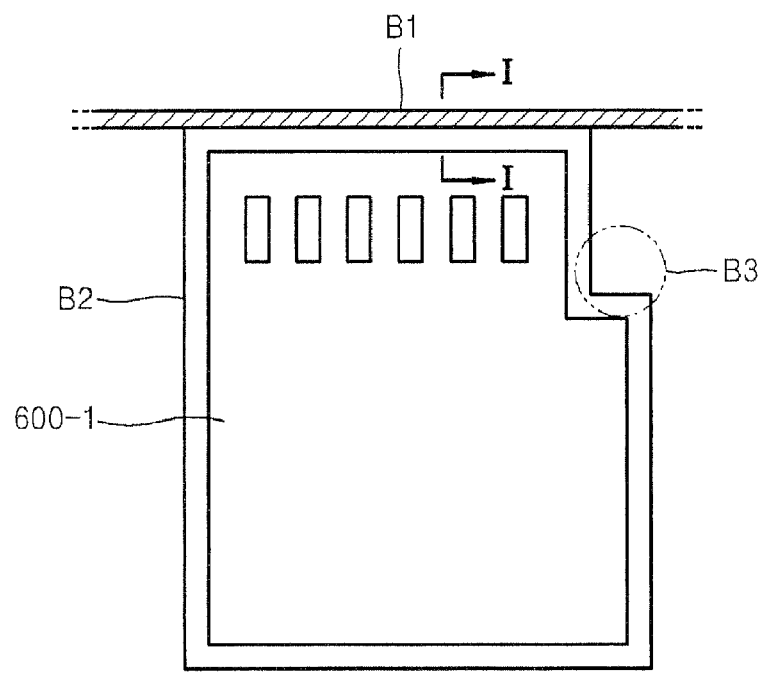
FIGS. 5A through 5C are plan views and a cross-sectional view illustrating cutting lines of a package according to one embodiment.
Figure 5B:
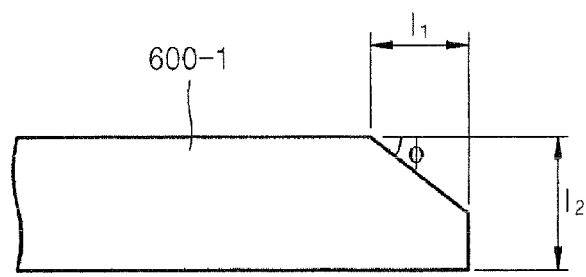
Figure 5C:
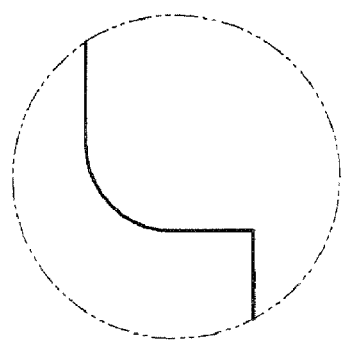

FIGS. 5A through 5C are plan views and a cross-sectional view illustrating cutting lines of a package according to one embodiment.

FIG. 5A is a plan view illustrating a cutting line of a package 600-1. As shown in FIG. 5A, the cutting line may be divided into a chamfer-cutting line B1 and a router-cutting line B2. The router-cutting line B2 may be divided into a curved line portion (shown inside region B3) and a straight line portion (shown outside region B3).

FIG. 5B is a cross-section view taken along line I-I of FIG. 5A. Referring to FIG. 5B, a chamfer-cutting line B1 of the cutting line is chamfered at a predetermined angle φ with respect to a surface of the package 600-1. Here, the predetermined angle φ and an inclination length $l_1$ may be selected depending upon a characteristic of the package 600-1 and depending upon a thickness $l_2$ of the package 600-1.

FIG. 5C is a plan view illustrating an enlarged view inside region B3. As shown in FIG. 5C, the curved line portion is cut along a curved line having a predetermined curvature. Thus, a router bit having a small diameter may be used to reduce the predetermined curvature. However, if the diameter of the router bit becomes too small, a cutting speed will become too slow and difficult to control. Thus, a router bit having an appropriate diameter should be selected.

Figure 6A:
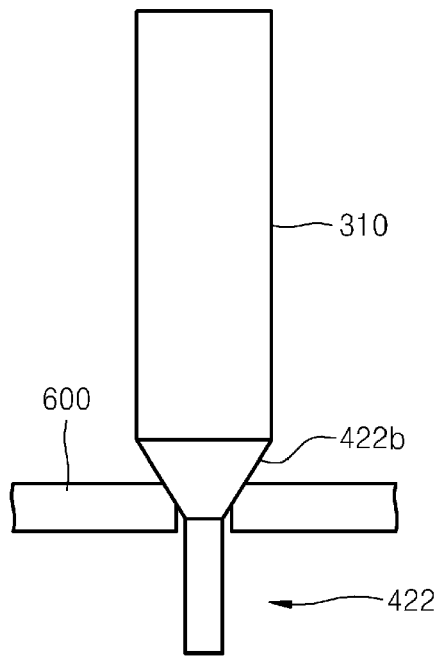
FIGS. 6A through 6C are cross-sectional views of cutting bits used in the apparatus illustrated in FIG. 4.
Figure 6B:
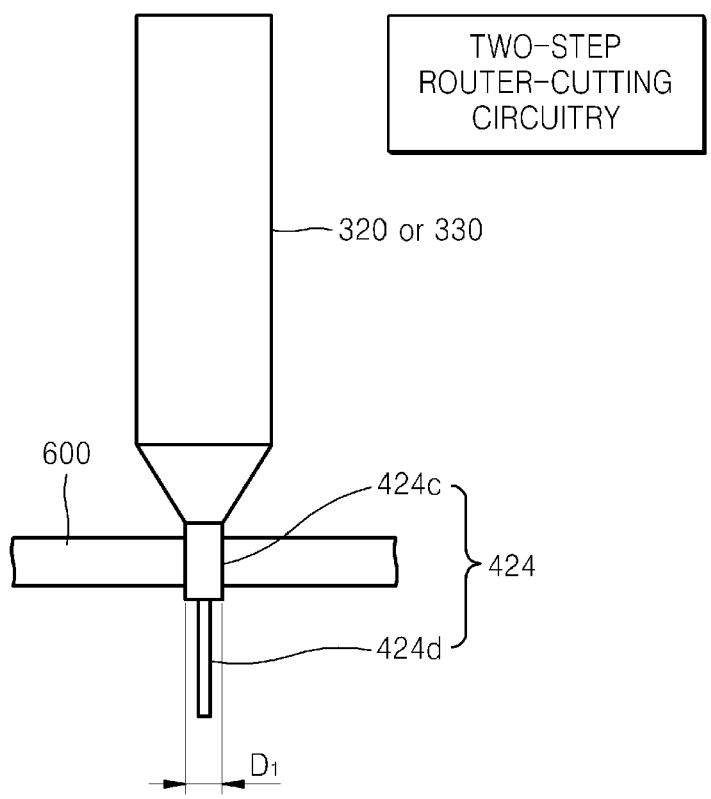
Figure 6C:
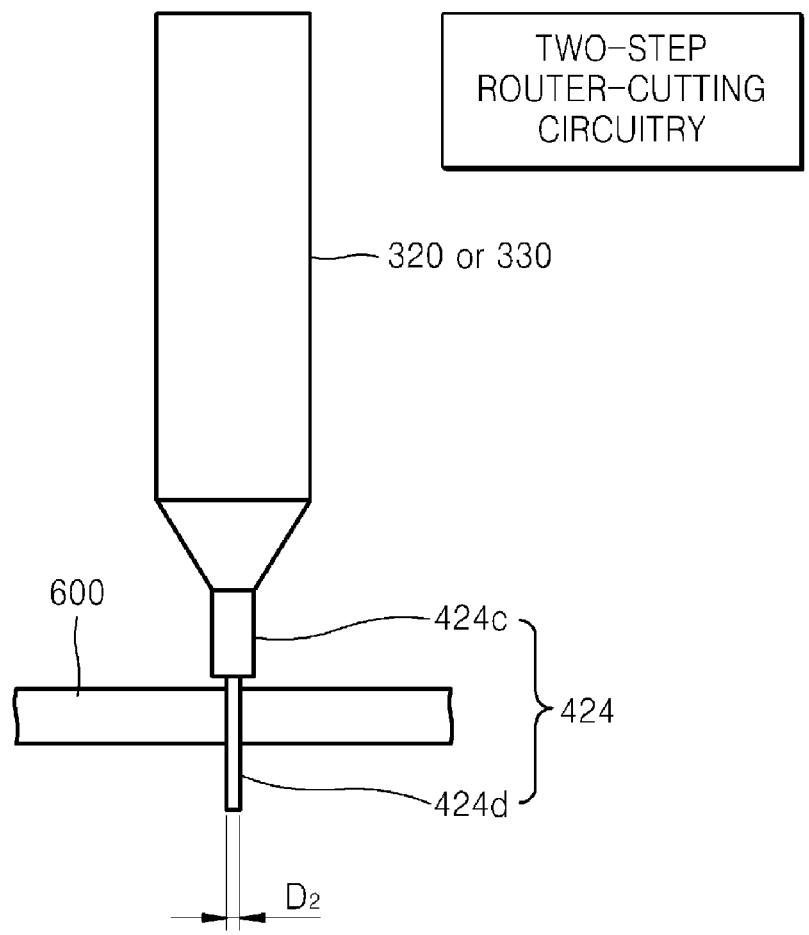

FIGS. 6A through 6C are cross-sectional views of cutting bits used in the apparatus illustrated in FIG. 4. Specifically, FIG. 6A is a cross-sectional view illustrating a chamfer-cutting process performed using a chamfer bit, FIG. 6B is a cross section view illustrating a router-cutting process along a substantially straight line using a straight-line cutting portion of a two-step router bit and FIG. 6C is a cross-sectional view illustrating a router-cutting process along a curved line using curved-line cutting portion of the two-step router bit shown in FIG. 6B.

Referring to FIG. 6A, a package 600 is chamfer-cut using an inclined portion 422b of a chamfer bit 422. It is desirable to perform the chamfer-cutting as precisely as possible to attain a predetermined inclination angle φ and inclination length $l_1$ as shown in FIG. 5A. In the case of the predetermined inclination angle φ, the chamfer-cutting is performed according to a predetermined inclination angle of the chamfer bit 422. This is not a problem. The inclination length $l_1$ depends on a height of the chamfer bit 422. Thus, the height of the chamfer bit 422 installed at a spindle must be exactly measured. This will be described in more detail later with reference to FIGS. 7A and 7B.

Referring to FIG. 6B, the straight line portion shown outside region B3 in FIG. 5A may be router-cut using a two-step router bit 424. In one embodiment, the two-step router bit 424 may include cutting blade having a straight-line cutting portion 424c and a curved-line cutting portion 424d. In one embodiment, the straight-line cutting portion 424c may be disposed above the curved-line cutting portion 424d. A diameter $D_1$ of straight-line cutting portion 424c is about 1.2 mm. It will be appreciated, however, that $D_1$ may vary depending on the type of frame, a cutting speed, and the like. Referring to FIG. 6C, the curved line within the region B3 shown in FIG. 5A is cut using a curved-line cutting portion 424d. A diameter $D_2$ of the curved-line cutting portion 424d is about 0.5 mm. It will be appreciated, however, that $D_2$ may vary depending on the type of frame, a size of a curved line, and the like.

In one embodiment, a router-cutting spindle can router-cut a frame using the two-step router bit 424. Accordingly, a height of the two-step router bit 424 can be automatically adjusted via two-step router-cutting circuitry to cut substantially straight and curved lines. Thus, router-cutting can be rapidly performed without replacing a router bit. In another embodiment, a router-cutting spindle can router-cut a frame by alternately installing a straight-line router bit for router-cutting a substantially straight line and a curved-line router bit for cutting a curved line within the router-cutting spindle.

Figure 7A:
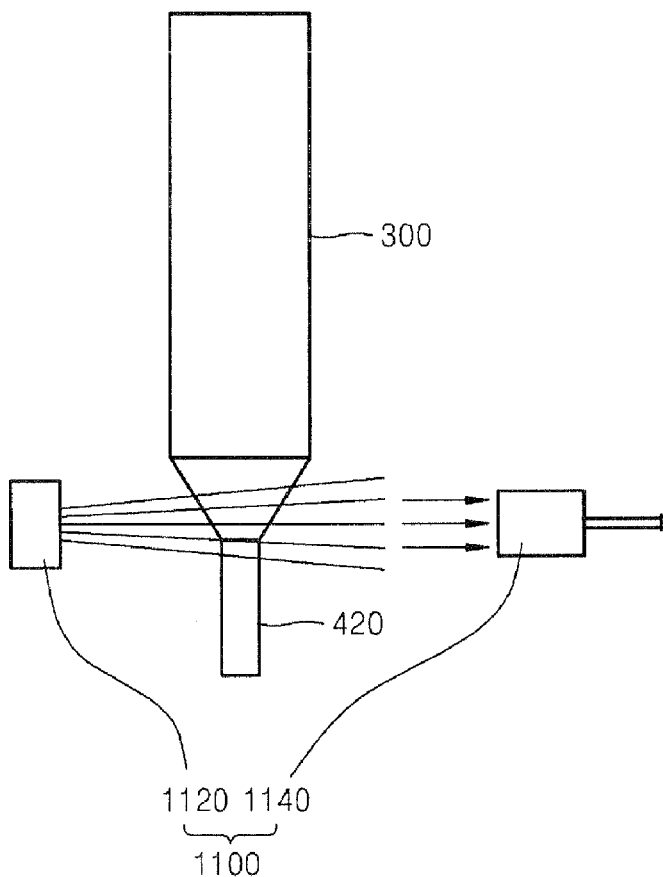
FIG. 7A is a cross-sectional view illustrating checking of a height of a cutting bit installed at a spindle of the apparatus illustrated in FIG. 4 using an optical sensor.

FIG. 7A is a cross-sectional view illustrating checking of a height of a cutting bit installed at a spindle of the package cutting apparatus illustrated in FIG. 4 using a bit height installation checker.

Referring to FIG. 7A, a bit height installation checker 1100 may, for example, include a light source 1120 and an optical sensor 1140 such as a charge-coupled device (CCD) camera. The light source 1120 emits light. The CCD camera 1140 receives the light emitted from the light source 1120 to optically show a combination of the cutting bit with the spindle. In one embodiment, a combination of a cutting bit 420 with the spindle 300 is checked using the bit height installation checker 1100 to check an exact height of the cutting bit 420. In other words, a poor check of a height of a cutting bit using a conventional sensor can be prevented in the present embodiment. A check of a cutting bit using the bit height installation checker 1100 may be useful to check a height of a chamfer bit 422 requiring an exact height check.

Figure 3A:
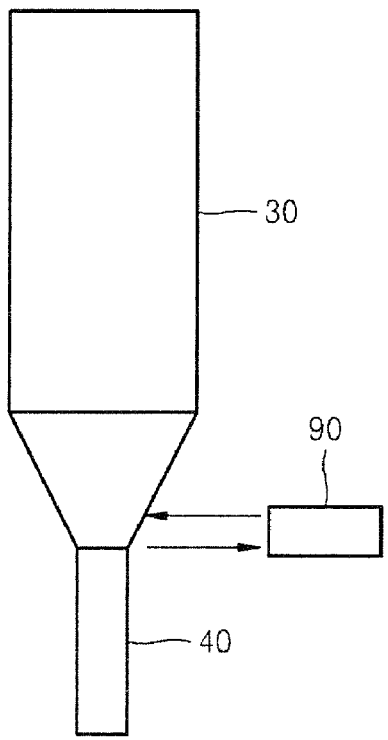
FIG. 3A is a cross-sectional view illustrating checking of a height of a cutting bit using a sensor according to the prior art.
Figure 3B:
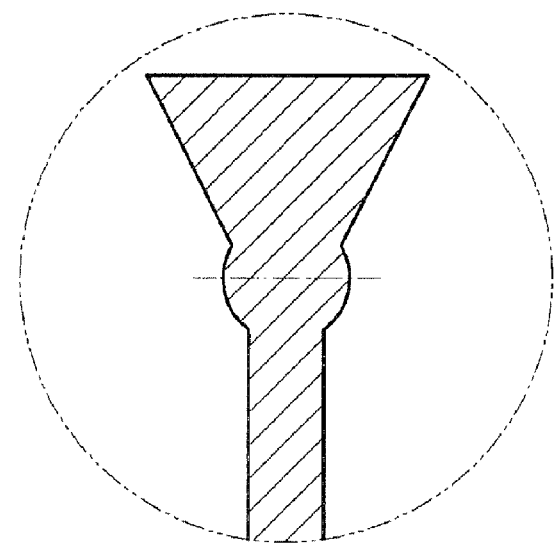
FIG. 3B is a view illustrating a shape of a combined part of a cutting bit sensed by a sensor illustrated in FIG. 3A.
Figure 7B:
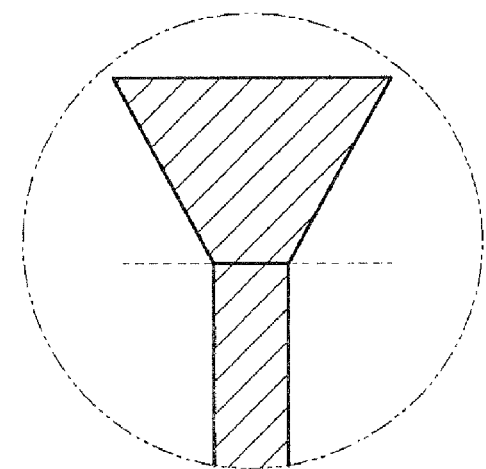
FIG. 7B is a view illustrating a shape of a combined part of the cutting bit sensed by the vision illustrated in FIG. 7A.

FIG. 7B is a view illustrating a shape of a combined part of a cutting bit sensed by the optical sensor 1100 illustrated in FIG. 7A. As shown in FIG. 7B, a part of a cutting bit combined with a spindle is clear, unlike in FIG. 3B. Thus, a height of the cutting bit can be exactly checked.

Figure 8:
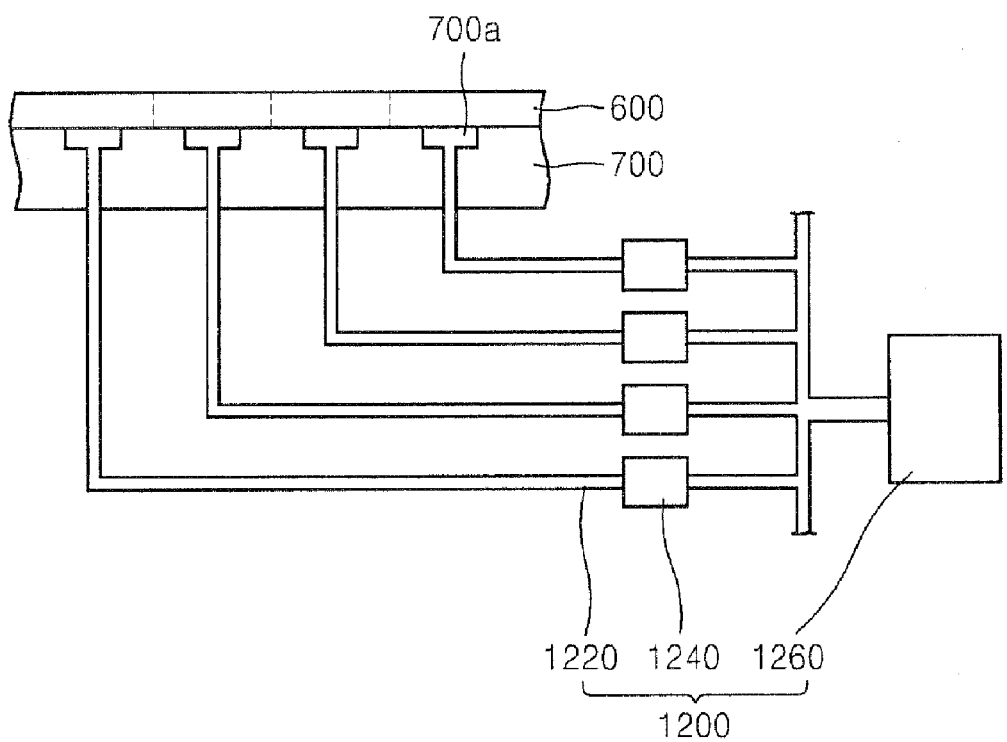
FIG. 8 is a cross-sectional view of a vacuum adsorption apparatus adopted in a frame loading jig of the apparatus illustrated in FIG. 4.

FIG. 8 is a cross-sectional view of a vacuum adsorption apparatus adopted in the frame loading jig of the package cutting apparatus illustrated in FIG. 4.

Referring to FIG. 8, a vacuum adsorption apparatus 1200 may, for example, include vacuum tubes 1220, vacuum drivers 1240, and a vacuum pump 1260. The vacuum tubes 1220 are connected to vacuum holes 700a formed in the frame loading jig 700. The vacuum drivers 1240 perform vacuum on-off functions of corresponding ones of the vacuum tubes 1220. The vacuum pump 1260 generates a vacuum. Pressure sensors may be formed in the vacuum tubes 1220 to measure vacuum pressures.

If a conventional vacuum adsorption apparatus adopted in a frame loading jig provides vacuum on-off functions to the vacuum holes 700a all at once and errors occur in the vacuum holes 700a, an error can be caused during cutting of the frame 600. As a result, the entire frame 600 must be scrapped. However, the vacuum adsorption apparatus 1200 exemplarily described herein can separately provide the vacuum on-off functions to individual the vacuum holes 700a. Thus, only poor packages can be scrapped and other packages can be used. Thus, yield of a cutting process can be considerably improved.

Figure 9:
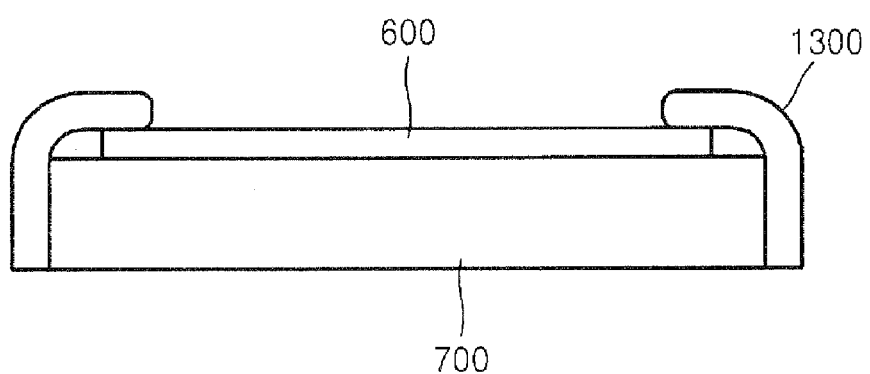
FIG. 9 is a cross-sectional view of a clamp clamping a frame during a process of cutting a package using the apparatus illustrated in FIG. 4.

FIG. 9 is a cross-sectional view of a clamp clamping a frame during a process of cutting a package using the package cutting apparatus illustrated in FIG. 4.

Referring to FIG. 9, the frame 600 may be fixed to the frame loading jig 700 through vacuum adsorption during a cutting process. However, if a vacuum pressure is insufficient, then the frame 600 will move (e.g., ascend) with a cutting bit. As a result, poor cutting is caused. Thus, in the exemplarily illustrated embodiment, the frame 600 is clamped using vacuum adsorption apparatus (not shown) and a clamp 1300 may be provided to both sides of the frame 600 to stably clamp the frame 600 to the frame loading jig 700. Therefore, poor cutting caused by poor clamping of a frame can be further certainly prevented.

Figure 10:
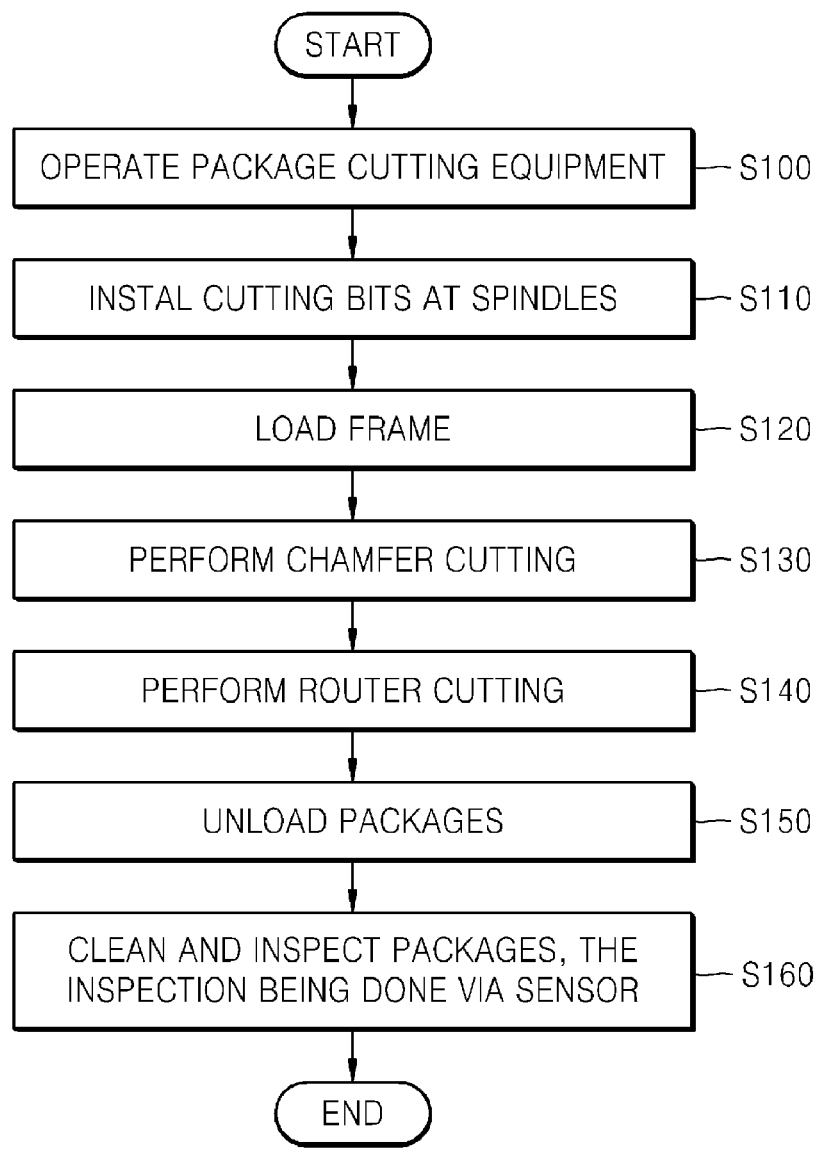
FIG. 10 is a flowchart of a method of cutting a package using the apparatus illustrated in FIG. 4 according to one embodiment.

FIG. 10 is a flowchart of a method of cutting a package using the package cutting apparatus illustrated in FIG. 4 according to an embodiment of the present invention. An exemplary method of cutting a package using the package cutting apparatus will now be described with reference to FIGS. 4 and 10.

Referring to FIG. 10, in operation S100, the package cutting apparatus is operated. In operation S110, the cutting bits 420 are installed at the spindle 300. As described above, the chamfer bit 422 is installed at the chamfer-cutting spindle 310 and the router bits 424 are installed at the router-cutting spindles 320 and 330. In operation S120, a frame 600 to be cut is loaded on the frame loading jig 700 by the frame picker 820.

In operation S130, the frame 600 that has been loaded on the frame loading jig 700 is subsequently chamfer-cut by the chamfer-cutting spindle 310. In operation S140, the frame 600 is then router-cut by one or more of the router-cutting spindles 320 and 330. In operation S150, packages which have been completely cut from the frame 600 are unloaded from the frame loading jig 700 by the unit picker 840. In operation S160, the packages are cleaned and determined to be high quality or poor quality.

The process described above outlines an exemplary process of cutting one frame at a time. It will be appreciated, however, that a plurality of frames may be simultaneously cut using the package cutting apparatus exemplarily described above. For example, while one frame is chamfer-cut by the chamfer-cutting spindle 310, other frames may be router-cut by one or more of the router-cutting spindles 320 and 330. Also, the loading and unloading of frames may be continuously performed during the cutting process.

Figure 11A:
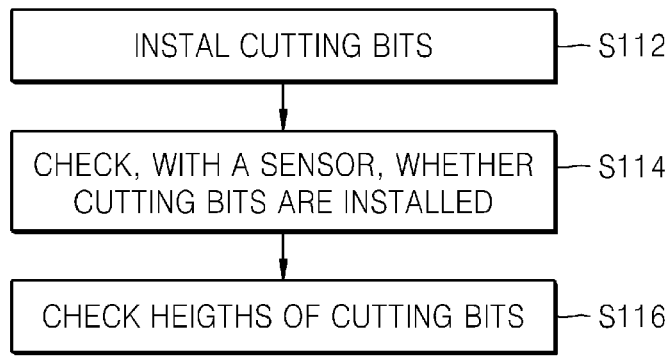
FIGS. 11A through 11C are flowcharts of operations of the method of FIG. 10.
Figure 11B:
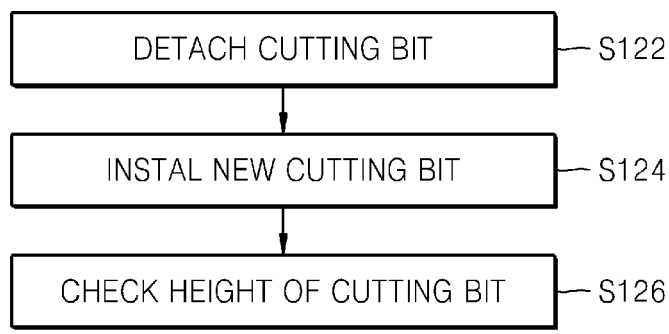
Figure 11C:
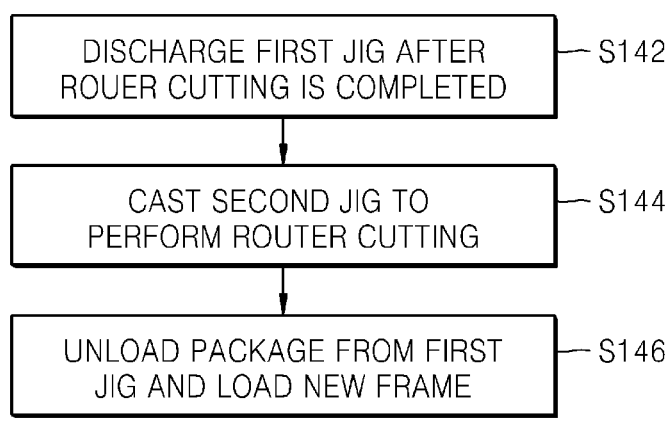

FIGS. 11A through 11C are flowcharts of various operations related to the method shown in FIG. 10.

FIG. 11A is a flowchart of a process of installing a cutting bit. Referring to FIG. 11A, in operation S112, a cutting bit is installed. In operation S114, a check is made as to whether the cutting bit is installed using a bit check sensor. In operation S116, a height of the cutting bit is checked using an optical sensor.

Referring to FIG. 11B, if a cutting bit (e.g., a chamfer bit or a router bit) wears down and needs to be replaced during a cutting process, the cutting bit is detached from a spindle in operation S122. In operation S124, a new cutting bit is installed at the spindle. In operation S126, a height of the new cutting bit is checked using a vision.

FIG. 11C is a flowchart of an operation of the dual frame loading jig 740. In operation S142, router-cutting is completed and the first jig 742 is then discharged from the work table. In operation S144, the second jig 744, which waits is cast onto the work table to immediately perform router-cutting. In operation S146, completely cut packages are unloaded from the first jig 742 by the unit picker 840, and a completely chamfer-cut frame is loaded on the first jig 742 by the frame picker 820 and waits for next router-cutting.

According to the embodiments exemplarily described above, three spindles may be used and chamfer-cutting and router-cutting may be separately performed. Thus, a time required for replacing a chamfer bit with a router bit can be reduced. Also, the chamfer-cutting and the router-cutting can be simultaneously performed to reduce a time required for a cutting process. Thus, productivity can be considerably increased.

According to additional embodiments exemplarily described above, the apparatus can use a dual-frame loading jig and a two-step router bit to rapidly perform the router-cutting without replacing router bits having different sizes.

According to additional embodiments exemplarily described above, the apparatus can include a vacuum adsorption apparatus adapted to perform a vacuum on-off function with respect to individual packages and also include a clamp to fix a frame. Thus, the cutting process can be further stably performed. As a result, yield of the cutting process can be improved. What follows below are exemplary aspects and embodiments of the present invention.

According to an aspect of the present invention, there is provided an equipment for cutting a package including: at least two spindles installed at a sawing robot and cutting a frame including a plurality of packages into packages using cutting bits; a frame loading jig loading the frame so that the frame is cut; and a frame-and-unit picker installed at an orthogonal robot to load and unload the frame on and from the frame loading jig, wherein a state of the cutting bit installed at the spindle is checked using a vision.

The cutting bits may include a chamfer bit chamfer-cutting a package so that a cutting section of the package inclines and router bits router-cutting an external part of the package comprising a curved line part except for the chamfer-cut part, wherein the chamfer and router bits are installed at the spindles to perform the chamfer-cutting and the router-cutting. One of the spindles may be a chamfer-cutting spindle at which the chamfer is installed to perform only the chamfer-cutting, and the other spindles may be router-cutting spindles at which the router bits are installed to perform only the router-cutting. The spindles may include a chamfer-cutting spindle and two router-cutting spindles, wherein while the chamfer-cutting spindle chamfer cuts two frames, the two router-cutting spindles each router-cut one frame.

The router bits may include a straight-line router bit cutting a straight line, a curved-line router bit cutting a curved line, and a two-step router bit cutting the straight and curved lines, wherein the router-cutting spindles router-cut the package with the straight and curved-line router bits replaced or router-cut the package using the two-step router bit. The router-cutting may be performed using the two-step router bit, the straight line is cut using the upper part of the two-step router bit having a large diameter, and the curved line is cut using the lower part of the two-step router bit having a small diameter.

The equipment may further include a bit installing checker checking whether the cutting bits are installed at the spindles, wherein the bit installing checker includes a bit sensor checking whether the cutting bits are installed at the spindles and the vision checking whether states of the cutting bits installed at the spindles. The vision may check heights of the cutting bits installed at the spindles.

A dual frame loading jig including first and second jigs may be positioned under the router-cutting spindle. Frames completely chamfer-cut by the chamfer-cutting spindle may be respectively loaded on the first and second jigs of the dual frame loading jig. The first jig performs router-cutting, the second jig may be a frame waiting jig waiting while the frame on the first jig is router cut, and functions of the first and second jigs may be replaced with each other when the frames are completely router cut.

Vacuum adsorption holes may be formed in the frame loading jig to fix the frames, wherein the vacuum adsorption holes respectively correspond to the packages and separately perform vacuum on-off functions. The frame-and-unit picker may include a frame picker and a unit picker, wherein the frame picker loads the frame on the frame loading jig, and the unit picker unloads completely cut packages from the dual frame loading jig.

The cutting bits may be loads on a bit loading jig which is attachable to and/or detachable from the equipment, so as to be supplied into the equipment during the process of cutting the packages. The cutting bits may be automatically supplied onto a work table on which the frame loading jig is put and fixed, by an auto bit loader.

The frame on the frame loading jig may be fixed during the cutting process through a vacuum adsorption and a clamp formed at an outer surface of the dual frame loading jig.

The equipment may further include sorting boxes sorting out and storing the completely cut packages depending on whether the completely cut packages are high quality or poor quality, wherein the sorting boxes are classified into a high quality box, a poor quality box, and an empty box, and the poor quality box is divided into n parts to selectively scrap or re-use the packages.

According to another aspect of the present invention, there is provided a method of cutting a package using equipment for cutting a package, including: installing cutting bits at spindles; loading a frame on a frame loading jig; cutting the frame using the spindles; and unloading completely cut packages, wherein states of the cutting bits installed at the spindles are checked using a vision.

The cutting of the frame using the spindles may include: performing chamfer-cutting using a chamfer-cutting spindle at which the chamfer bit is installed; and performing router-cutting using a router-cutting spindle at which the router bit is installed.

If the chamfer bit or the router bits wears and thus is replaced in the chamfer-cutting or the router-cutting, the method may further include: detaching the chamfer bit or the router bits; installing a new chamfer bit or new router bits; and checking a state of the new chamfer bit or the new router bits using a vision.

The frame-and-unit picker may include a frame picker and a unit picker, wherein the frame picker loads the frame on the frame loading jig, and the unit picker unloads a completely cut frame from the frame loading jog, picks up a package to put the package in a package cleaning zone, and picks up the package when a top side of the package is completely cleaned, so as to clean a bottom side of the package with the package picked up. The unit picker may put a completely cleaned package in a junction pocket determining whether a package is high quality or poor quality and keep picking up the package to inspect an external appearance of the bottom side of the package when an external appearance of the top side of the package is completed using the vision.

The loading of the frame may include loading the frame on the frame loading jig and then aligning fiducial marks on the frame using the vision.

While the embodiments have been particularly shown and described above, it will be understood by those of ordinary skill in the art that various changes in form and details may be made therein without departing from the spirit and scope of the present invention as defined by the following claims.

What is claimed is:

1. A package cutting apparatus, comprising:
   a sawing robot;
   a plurality of spindles coupled to the sawing robot;
   a plurality of cutting bits coupled to the plurality of spindles for cutting a package from a frame during a cutting process;
   a frame loading jig for supporting the frame during the cutting process;
   a further robot;
   a frame-and-unit picker coupled to the further robot for loading and unloading a frame onto and off from the frame loading jig; and
   a first sensor for checking a state of one of the plurality of cutting bits coupled to a corresponding one of the plurality of spindles,
   wherein one of the plurality of cutting bits is a two-step router bit having a first cutting portion of a first diameter and a second cutting portion of a second different diameter, the apparatus including two-step router-cutting circuitry adapted to automatically control a router cutting operation with the two-step router bit such that the first cutting portion router-cuts a straight line along the package and the second cutting portion router-cuts a curved line along the package.

2. The apparatus of claim 1, wherein the plurality of cutting bits comprise:
   a chamfer bit for chamfer-cutting a first region of the package; and
   wherein the one router bit is for router-cutting a second region of the package different than the first region.

3. The apparatus of claim 2, wherein
   a first one of the plurality of spindles is a chamfer-cutting spindle;
   a second one of the plurality of spindles is a router-cutting spindle;
   the chamfer bit is coupled to the first one of the plurality of spindles for performing only chamfer-cutting; and
   the one router bit is coupled to the second one of the plurality of spindles for performing only router-cutting.

4. The apparatus of claim 3, wherein a third one of the plurality of spindles is a router-cutting spindle and a second router bit is coupled to the third one of the plurality of spindles for performing only router-cutting.

5. The apparatus of claim 3, wherein the chamfer bit includes a cutting portion that is inclined at a chamfer angle with respect to a longitudinal axis of the chamfer bit.

6. The apparatus of claim 1, wherein:
   the first diameter is larger than the second diameter.

7. The apparatus of claim 6, wherein the first diameter is about 1.2 mm and the second diameter is about 0.5 mm.

8. The apparatus of claim 1, wherein the second diameter is of a lower part of the two-step router bit and is about 0.5 mm and the first diameter is of an upper part of the two-step router bit and is about 1.2 mm.

9. The apparatus of claim 1, wherein the first cutting portion of the two-step router bit is an upper part of the two-step router bit, and the second cutting portion of the two-step router bit is a lower part of the two-step router bit.

10. The apparatus of claim 1, wherein the first diameter is about 1.2 mm and the second diameter is about 0.5 mm.

11. The apparatus of claim 1, further comprising a second sensor for checking whether a cutting bit is coupled at one of the plurality of spindles.

12. The apparatus of claim 1, wherein the first sensor is a bit height installation checker for checking a height of the cutting bit installed at one of the plurality of spindles.

13. The apparatus of claim 12, wherein the first sensor comprises:
   a light source for emitting light; and
   an optical sensor for visually showing a combination of the checked cutting bit with the corresponding spindle.

14. The apparatus of claim 13, wherein the optical sensor includes a charge-coupled device (CCD) camera.

15. The apparatus of claim 1, wherein the plurality of spindles comprise:
a chamfer-cutting spindle for chamfer-cutting a first region of the package; and
at least one router-cutting spindle for cutting a second region of the package outside different than the first region.

16. The apparatus of claim 15, wherein the frame loading jig comprises a router-cutting frame loading jig locatable under the at least one router-cutting spindle, wherein the router-cutting frame loading jig comprises a first router-cutting frame loading jig and a second router-cutting frame loading jig.

17. The apparatus of claim 16, wherein each of the first and second router-cutting frame loading jigs are configured to support a frame.

18. The apparatus of claim 1, further comprising a plurality of vacuum adsorption holes disposed in the frame loading jig for fixing the frame against a surface of the frame loading jig, wherein a location of one of the plurality of vacuum adsorption holes within the frame loading jig corresponds to a location of the package within the frame.

19. The apparatus of claim 18, wherein the plurality of vacuum adsorption holes are independently controllable to independently perform vacuum on-off functions.

20. The apparatus of claim 19, further comprising:
a vacuum pump;
a plurality of vacuum tubes connecting corresponding ones of the plurality of vacuum adsorption holes to the vacuum pump;
a plurality of vacuum drivers connected between the vacuum pump and corresponding ones of the plurality of vacuum adsorption holes for selectively placing corresponding ones of the plurality of vacuum adsorption holes and the vacuum pump in communication; and
a pressure sensor within each of the plurality of vacuum tubes for measuring a vacuum pressure within the plurality of vacuum tubes.

21. The apparatus of claim 19, further comprising a clamp for fixing a frame onto the frame loading jig, wherein the clamp is formed at an outer surface of the frame loading jig.

22. The apparatus of claim 1, wherein the frame-and-unit picker comprises:
a frame picker for loading a frame on the frame loading jig; and
a unit picker for unloading cut packages from the frame loading jig.

23. The apparatus of claim 22, further comprising a package cleaner for cleaning the cut packages, wherein the cut packages are receivable within the package cleaner from the unit picker.

24. The apparatus of claim 22, further comprising an appearance sensor, wherein the unit picker and appearance sensor are configured to inspect an external appearance of the package.

25. The apparatus of claim 1, further comprising a bit loading jig for supporting a plurality of cutting bits.

26. The apparatus of claim 25, further comprising:
a work table for fixing the frame loading jig, wherein the plurality of cutting bits supported by the bit loading jig are suppliable to the work table; and
an auto bit loader for supplying the plurality of cutting bits onto the work table from the bit loading jig.

27. The apparatus of claim 1, further comprising a plurality of sorting boxes for storing packages cut during the cutting process, the plurality of sorting boxes comprising:
a high quality sorting box for storing cut packages having a characteristic that meets a threshold quality;
a poor quality sorting box for storing cut packages having a characteristic that does not meet the threshold quality; and
an empty sorting box,
wherein the poor quality sorting box is divided into 'n' parts for storing packages that are to be scrapped and packages that are to be re-used.

28. The apparatus of claim 27, further comprising sorting circuitry for sorting packages into the plurality of sorting boxes.

* * * * *